United States Patent

Healy et al.

[11] Patent Number: 5,993,313
[45] Date of Patent: Nov. 30, 1999

[54] ROTOR CAGE GRATE RETAINER

[75] Inventors: Jason M. Healy, Lincoln, Kans.; Joseph E. Story, Green Top, Mo.

[73] Assignee: Deere & Company, Molene, Ill.

[21] Appl. No.: 09/002,576

[22] Filed: Jan. 3, 1998

[51] Int. Cl.⁶ ....................................................... A01F 12/60
[52] U.S. Cl. .......................... 460/119; 460/108; 460/109; 460/110
[58] Field of Search ..................... 460/119, 108, 460/109, 110, 72, 104, 141

[56] References Cited

U.S. PATENT DOCUMENTS

| | | | |
|---|---|---|---|
| 3,871,384 | 3/1975 | Depauw et al. | |
| 3,957,058 | 5/1976 | Komancheck | 460/108 |
| 4,031,901 | 6/1977 | Rowland-Hill | 460/108 |
| 4,499,908 | 2/1985 | Niehaus | |
| 4,988,326 | 1/1991 | Bennett | 460/108 X |
| 5,613,907 | 3/1997 | Harden | 460/109 X |

FOREIGN PATENT DOCUMENTS

| | | |
|---|---|---|
| 0396968 | 11/1990 | European Pat. Off. |
| 0841001 | 5/1998 | European Pat. Off. |
| 2062267 | 6/1971 | France |

Primary Examiner—Thomas B. Will
Assistant Examiner—Arpad Fabian Kovacs
Attorney, Agent, or Firm—James E. Bradley

[57] ABSTRACT

A threshing cage for a grain combine has a frame with permanent and removable panels. Each panel is a semi-circular arc which extends between adjacent frame members to form a cylindrical shape. Each panel has an arcuate rib on each axial end and a pair of axial supports which joins them together. A perforated screen extends between the ribs and axial supports. The panels are pivotally mounted on the frame members and rotated into a locking position with panel levers. The panel levers have a cam member which pivotally engages a mating slot in an adjacent frame member. The panels also have side arc clamps for locking their ribs to adjacent structural support members.

10 Claims, 2 Drawing Sheets

ROTOR CAGE GRATE RETAINER

TECHNICAL FIELD

This invention relates in general to grain combines and in particular to a quick-release cage grate for the threshing rotor of a grain combine.

BACKGROUND ART

The threshing section of a grain combine comprises a threshing rotor which rotates inside of a rotating threshing cage. The threshing cage has a perforated screen through which grain escapes from the threshing cage. The perforations must be properly sized for the grain being harvested in order to maximize the efficiency of the threshing process. Hence, some grains require screens with larger perforations while other grains require screens with smaller perforations. One type of prior art threshing cage and rotor, described in U.S. Pat. No. 5,499,948, are readily removable as an assembly.

Rotor cages without readily removable panels create several other problems. The cage may limit access to the threshing rotor within the threshing cage. In addition, the screen perforations will occasionally become clogged or plugged with crop material. A cage without readily removable panels is more difficult to work with and unplug. Finally, even if only a small portion of the screen is damaged, the entire cage must be repaired or replaced.

DISCLOSURE OF THE INVENTION

A threshing cage for a grain combine has a frame with permanent and removable panels. Each panel is a semi-circular arc which extends between adjacent frame members to form a cylindrical shape. Each panel has an arcuate rib on each axial end and a pair of axial supports which joins them together. A perforated screen extends between the ribs and axial supports. The panels are pivotally mounted on the frame members and rotated into a locking position with panel levers. The panel levers have a cam member which pivotally engages a mating slot in an adjacent frame member. The panels also have side arc clamps for locking their ribs to adjacent structural support members.

BEST MODE FOR CARRYING OUT THE INVENTION

Figure 1:
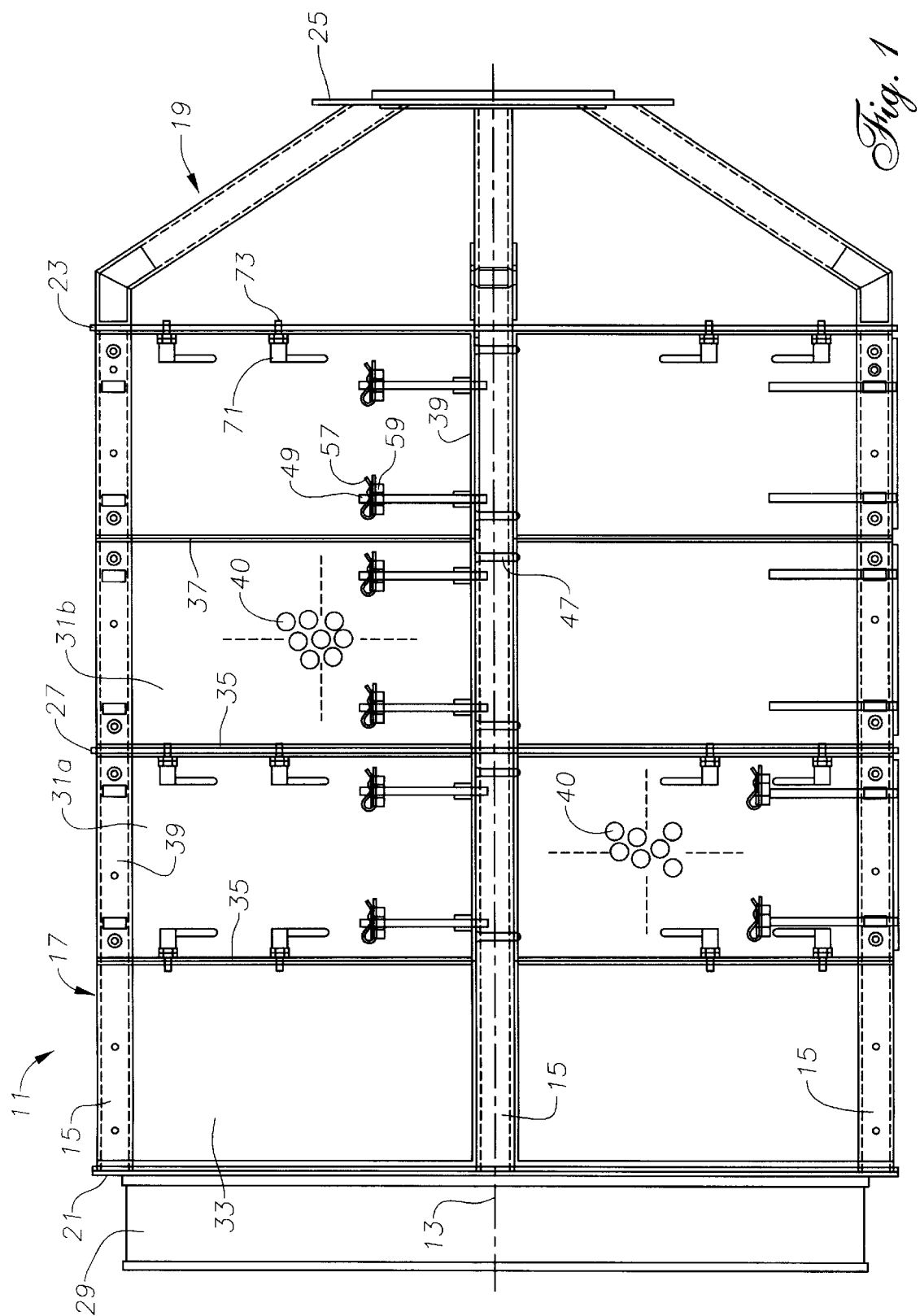
FIG. 1 is a top view of a threshing rotor cage with removable panels constructed in accordance with the invention.

Referring to FIG. 1, a threshing cage 11 for a grain combine is shown. Cage 11 has a longitudinal axis 13 and is supported by four symmetrically spaced apart frame members 15. Each frame member 15 is formed from square tubular steel. Each frame member 15 has a forward portion 17 which is parallel to axis 13, and a rearward portion 19 which extends radially inward and rearward relative to axis 13. The portions 17, 19 of each frame member 15 are welded together. A forward brace or ring 21 joins the forward ends of forward portions 17. A rearward ring 23 joins frame members 15 near the rearward ends of forward portions 17. A plate 25 joins the rearward ends of rearward portions 19. A central brace or ring 27 joins the centers of forward portions 17. Finally, a cylindrical ring 29 extends forward from forward ring 21.

Figure 2:
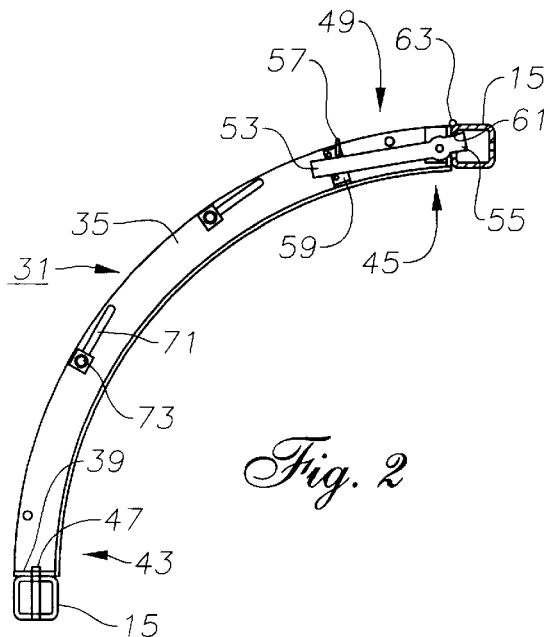
FIG. 2 is a side view of one of the panels of FIG. 1.

Cage 11 has a generally cylindrical appearance provided by a plurality of removable panels 31 and permanent panels 33. As shown in FIG. 2, each panel 31 is formed into an approximately 90 degree, semi-circular arc which extends between adjacent frame members 15. Thus, when panels 31 are installed between each pair of adjacent frame members 15, a complete, 360 degree cylinder is formed. Referring back to FIG. 1, each pair of adjacent frame members 15 has three panels installed between their forward portions 17: a small, permanently installed panel 33 is welded between the forward ends, a large removable panel 31b is located between their rearward ends, and a small removable panel 31a between panels 33 and 31b. Panels 31a are virtually identical to panels 31b except for their axial dimensions.

Each panel 31 has an arcuate rib 35 on each axial end which provides structural support. Long panels 31b have an extra rib 37 (FIG. 1) located centrally between ribs 35 for additional support. Each panel 31 also has a pair of longitudinal rib or frame members 39 which joins ribs 35, 37 for greater rigidity. Frame members 39 are transverse or perpendicular to ribs 35, 37 wherein they intersect. An arcuate perforated screen 41 extends between ribs 35, 37 and frame members 39. Screens 41 have a large number of perforations or holes 40 extending therethrough.

Referring again to FIG. 2, each panel 31 has a positioning edge 43 and a locking edge 45. Each positioning edge 43 has a plurality of holes in its frame member 39 which align with and receive an equal number of location pins 47 extending from adjacent frame members 15. Pins 47 are perpendicular to one side of square frame members 15.

Figure 3:
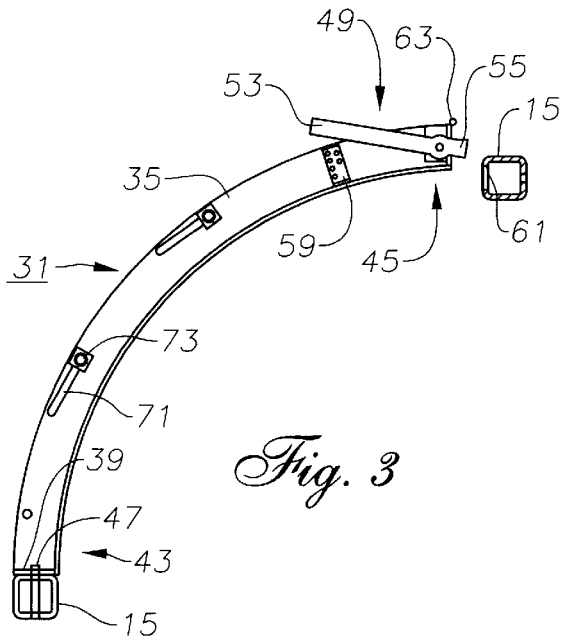
FIG. 3 is a side view of one of the panels of FIG. 1 in the unlocked position.
Figure 4:
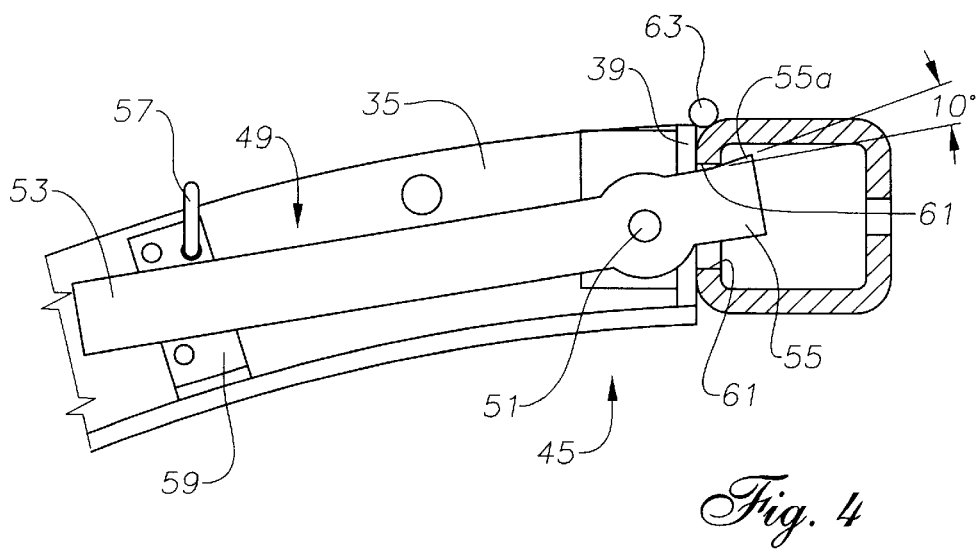
FIG. 4 is a detailed view of a portion of FIG. 2.

Referring to FIG. 4, locking edge 45 contains a pivotally mounted panel lever 49. Lever 49 pivots about an axially extending lever pivot 51 which is located near frame member 39 on locking edge 45. Lever 49 has a long, manually operated handle 53 on one end and a short pin or cam 55 which is integrally formed on its opposite end. The end 55a of cam 55 is tapered by ten degrees so that its distal end is thicker than its proximal end. Lever 49 may be secured in a locked position (FIGS. 1, 2 and 4) by moving handle 53 near screen 41 and inserting a clip 57 into a lever lock stand 59. Lever 49 may be pivoted to an unlocked position (FIG. 3) by removing clip 57 from lever lock stand 59 and moving handle 53 away from screen 41. When lever 49 is in the locked position, cam 55 engages a mating slot 61 in an adjacent frame member 15. Slots 61 are located on the opposite sides of square frame members 15 as pins 47. In the locked position, cam 55 forces positioning edge 43 against its adjacent frame member 15 and locking edge 45 against its adjacent frame member 15, thereby increasing the overall rigidity of cage 11. In the unlocked position, cam 55 pivots out of engagement with slot 61 so that panel 31 may be removed from cage 11. A lip or panel stop 63 extends axially along a radially outer edge of each locking edge 45. Stop 63 engages frame member 15.

Each panel 31 also has a plurality of side arc clamps 71. Clamps 71 are mounted on ribs 35 and are provided as secondary reinforcement locking mechanisms for panels 31. As shown in FIGS. 2 and 3, clamps 71 have locked and unlocked positions, respectively. Each clamp 71 pivotally engages and disengages an adjoining frame structural support with an axially movable pin 73. When clamps 71 are rotated to their locked positions (FIG. 2), pins 73 are moved axially outward of their ribs 35 to engage mating holes (not shown) in the adjoining structural support members. When clamps 71 are rotated 180 degrees to their unlocked positions (FIG. 3), pins 73 retract into ribs 35 to disengage their mating holes. For example, each panel 31b has two clamps 71 on its rearward rib 35 which engage rearward ring 23. Each panel 31a has two clamps 71 in each of its ribs 35. The clamps 71 in forward rib 35 of each panel 31a engage the rearward rib 35 of an adjacent permanent panel 33. The clamps 71 in rearward rib 35 of each panel 31a engage central ring 27 and the forward rib 35 of an adjacent panel 31b.

In operation, panels 31b are installed prior to panels 31a. Each panel 31b is installed by first locating the holes in positioning edge 43 on pins 47 of a frame member 15 (FIG. 3). Panel 31b is then pivoted about pins 47 toward the adjacent frame member 15 with levers 49 and clamps 71 in the unlocked position. As panel 31b abuts the adjacent frame member 15, panel stop 63 will assist in the proper alignment of panel 31b (FIG. 4). Each lever 49 is then moved to the locked position so that cams 55 engage slots 61. Clips 57 are inserted into lever lock stands 59 to prevent levers 49 from unlocking. After levers 49 are secure, each clamp 71 is moved to the locked position (FIG. 2). This procedure is then repeated for each panel 31b. After panels 31b are installed, each panel 31a may be installed in a similar manner.

The invention has several advantages. The removable panels allow the threshing cage of a grain combine to be quickly converted for different types of grain. The panels also allow easier access to the threshing rotor within the threshing cage. In addition, the removable panels make it easier to clean crop material from the perforated screen. Finally, if one of the screens is damaged, only the panel that contains the damaged screen will need to be repaired or replaced. This final advantage allows a replacement panel to be installed in place of the damaged one so that the combine can continue to be used.

While the invention has been shown or described in only some of its forms, it should be apparent to those skilled in the art that it is not so limited, but is susceptible to various changes without departing from the scope of the invention.

I claim:

1. A threshing cage in a grain combine having a longitudinal axis and an internal, coaxial rotating threshing rotor for threshing grain from crop material, comprising:

a threshing cage frame having a plurality of frame members;

a plurality of removable panels extending between adjacent ones of the frame members;

each of the panels having a pair of axially extending, structural reinforcement ribs located along axial edges of the panels, and a pair of transversely extending ribs joining and perpendicular to the axial ribs, wherein the transverse ribs are located along transverse edges of the panels, and a perforated screen extending between the ribs; and a plurality of locking mechanisms for each of the removable panels, each of the locking mechanisms having a locked position wherein the panel is removably fastened to the frame members, and an unlocked position wherein the panel may be individually removed from the frame members; and wherein at least some of the locking mechanisms comprise a pivotally mounted lever which pivotally engages a mating slot in an adjacent one of the frame members.

2. The threshing cage of claim 1 wherein each of the levers has a handle on one end and a cam on an opposite end, the cam engaging one of the mating slots.

3. The threshing cage of claim 1 wherein the frame members comprise longitudinal braces extending axially and interconnected by circular braces; and wherein the locking mechanism further comprises:

a side arc clamp on each of the panels which clamps a transverse edge of each of the panels to a circular brace.

4. A threshing cage in a grain combine having a longitudinal axis and an internal, coaxial rotating threshing rotor for threshing grain from crop material, comprising:

a threshing cage frame having a plurality of longitudinal braces extending axially and interconnected by circular braces;

a plurality of removable panels extending between adjacent ones of the braces, each of the panels having a pair of axially extending ribs located along axial edges of the panels, and a pair of transversely extending ribs joining and perpendicular to the axial ribs, the transverse ribs being located along transverse edges of the panels, and a perforated screen extending between the ribs;

a locking mechanism at each of the axial and transverse edges, each of the locking mechanisms having a locked position wherein the panel is removably fastened to the frame, and an unlocked position wherein the panel may be individually removed from the frame; and wherein each of the locking mechanisms comprises a pin with a mating slot, with at least some of the pins being mounted to a lever for movement between a locked position and an unlocked position.

5. The threshing cage of claim 4 wherein at least some of the locking mechanisms comprise a plurality of holes on one axial end of each of the panels which align with and receive an equal number of location pins extending from an adjacent one of the braces.

6. The threshing cage of claim 4 wherein each of the levers comprises a pivotally mounted lever which pivotally engages a mating slot in an adjacent one of the braces.

7. The threshing cage of claim 6 wherein each of the levers has a handle on one end and a cam on an opposite end, the cam engaging one of the mating slots.

8. The threshing cage of claim 4, further comprising a panel stop located on and extending axially along one of the axial edges of each of the panels for locating each of the panels relative to one of the braces.

9. The threshing cage of claim 4, wherein at least some of the locking mechanisms comprise a side arc clamp on each of the panels which clamps one of the transverse edges of each of the panels to a circular brace.

10. A threshing cage in a grain combine having a longitudinal axis and an internal, coaxial rotating threshing rotor for threshing grain from crop material, comprising:

- a threshing cage frame having a plurality of longitudinal braces extending axially and interconnected by circular braces;
- a plurality of arcuate, removable panels extending between adjacent ones of the braces, each of the panels having a pair of axially extending ribs located along axial edges of the panels, and a pair of transversely extending ribs joining and perpendicular to the axial ribs, the transverse ribs being located along transverse edges of the panels, and a perforated screen extending between the ribs, the panels forming a 360 degree cylindrical exterior when they are installed in the frame;
- a pivotally mounted lever at each of the axial edges, each of the levers having a handle on one end and a cam on an opposite end;
- a pivotally mounted latch at each of the transverse edges, each of the latches having an axially movable pin;
- a plurality of slots in each of the longitudinal braces for mating engagement with adjacent ones of the cams;
- a plurality of holes in each of the circular braces for mating engagement with adjacent ones of the pins; and wherein
- each of the levers and each of the latches has a locked position wherein the panel is removably fastened to the frame, and an unlocked position wherein the panel may be individually removed from the frame.

* * * * *